Oct. 29, 1935.  M. W. ZANDER  2,018,755
AIR CLEANER
Filed Feb. 19, 1934   2 Sheets-Sheet 1
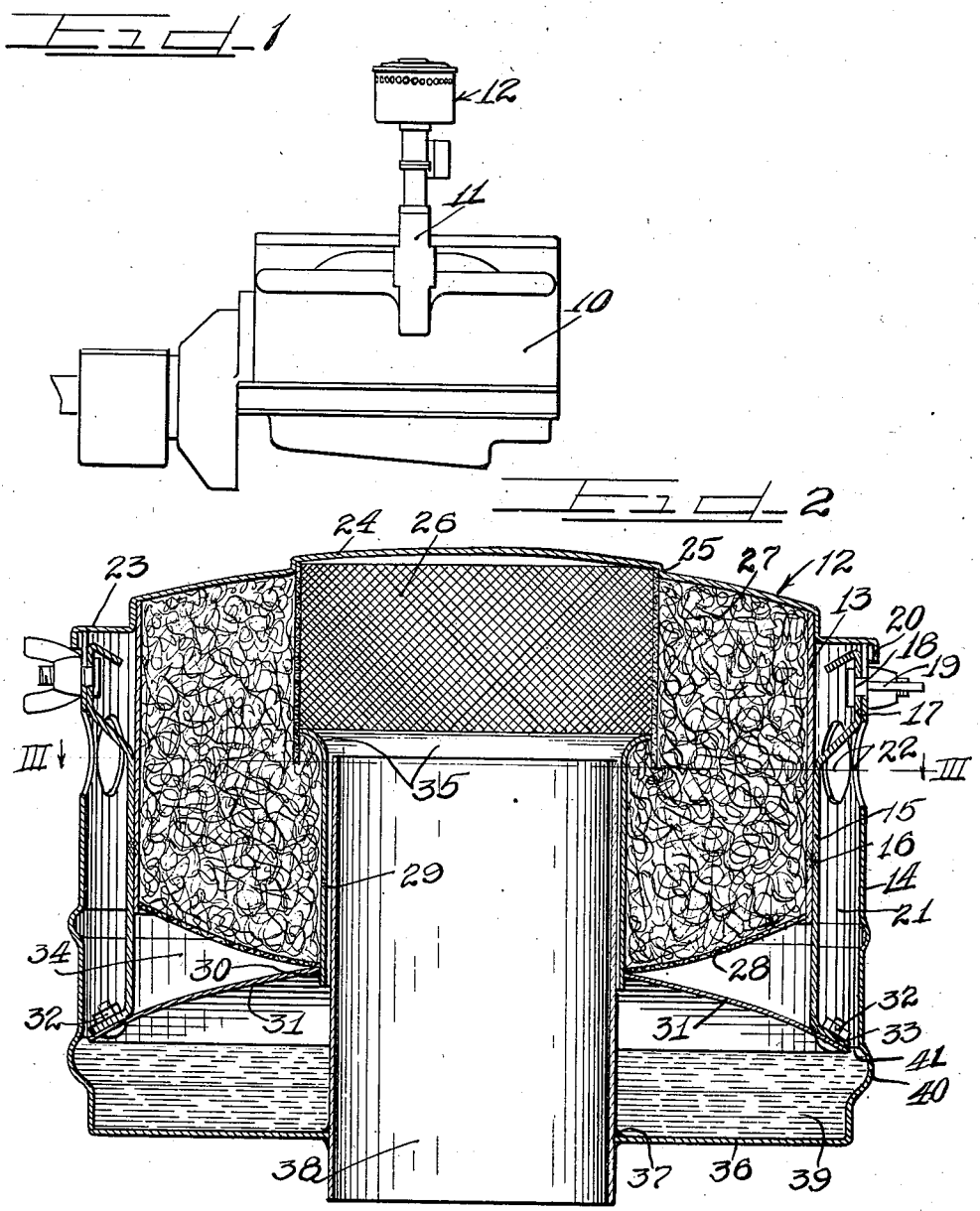
Inventor
Milton W. Zander.

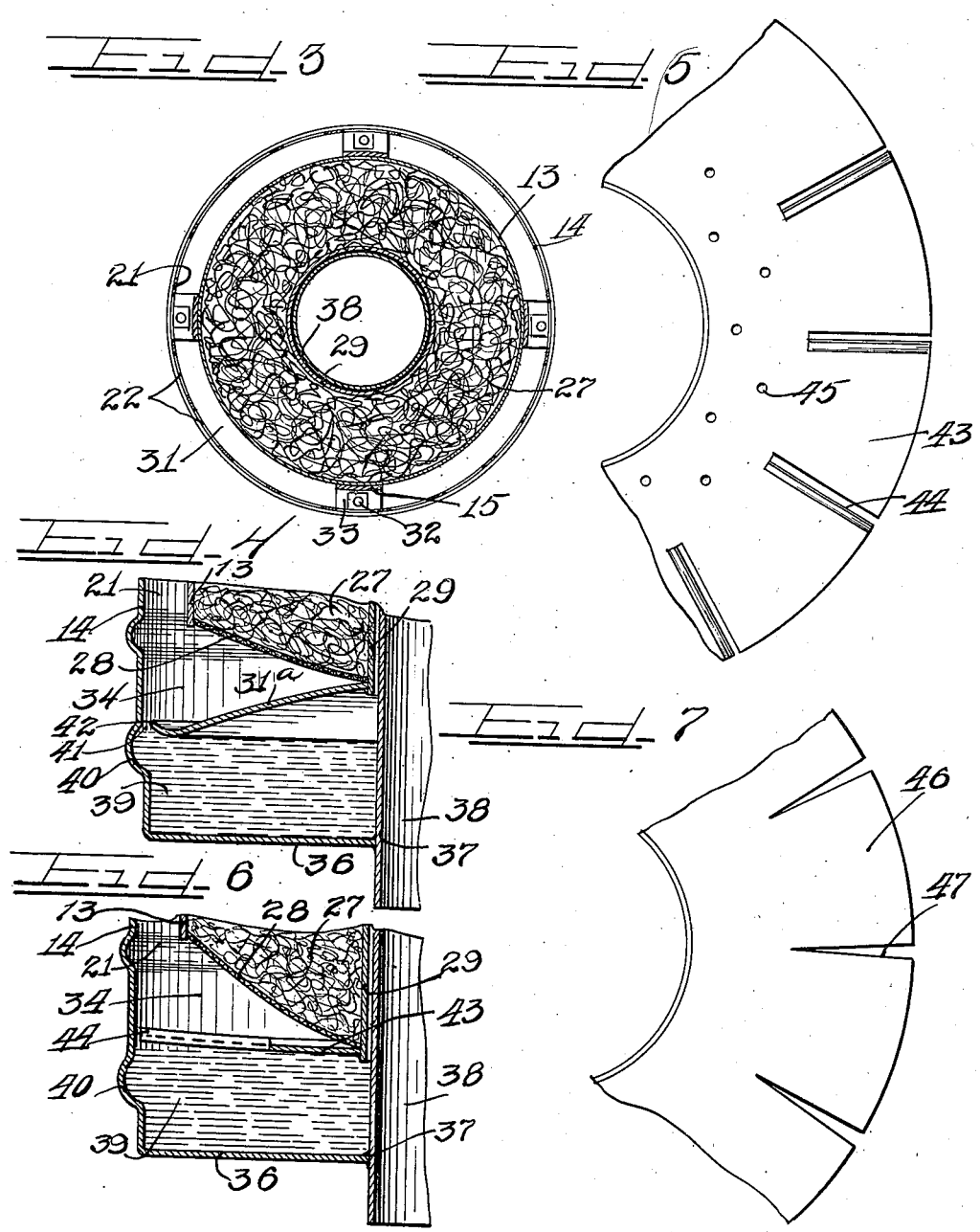

Patented Oct. 29, 1935

2,018,755

UNITED STATES PATENT OFFICE 2,018,755

AIR CLEANER

Milton W. Zander, Chicago, Ill.; Leslie H. Whipp administrator of said Milton W. Zander, deceased Application February 19, 1934, Serial No. 711,869

15 Claims. (Cl. 183—15)

This invention relates to improvements in air cleaners of the type suitable for use in connection with internal combustion engines, air compressors, brake mechanisms, and similar devices, the present invention being highly desirable for use in connection with a down-draft carburetor for internal combustion engines, although other and various purposes and uses of the invention will be apparent to one skilled in the art.

This invention embodies many of the features and principles embodied in the inventions set forth in my Letters Patent No. 1,951,384 issued March 20, 1934 and entitled "Air cleaner", and my copending application entitled "Air cleaner", Serial No. 665,649, filed April 12, 1933, although this invention includes new refinements and features of construction especially adapting the invention for positioning on top of a down-draft air intake, and also includes certain features of operation somewhat different from those included in my aforesaid patent and copending application.

It has become well recognized in the commercial field that the most efficient type of air cleaner for internal combustion engines, air compressors, and similar mechanisms, is the liquid bath type of cleaner in which the air is thoroughly mixed with a liquid, usually oil, and most, if not all, of the impurities are extracted by this washing action with the liquid, entrained liquid being subsequently removed prior to the exit of the cleaned air from the cleaner. Down-draft carburetion for internal combustion engines is being utilized more and more, and with a down-draft carbureter, it is desirable to have the air cleaner mounted upon the carbureter intake so that even in appearance the down-draft system is maintained intact. However, with an air cleaner mounted on top of the carbureter for an automotive engine, the air cleaner is necessarily of limited height due to the lack of space under the engine hood. Consequently, if incoming air is permitted to mix with the liquid, and carry this liquid into the filter element of the cleaner without any curbing whatsoever, the element would soon become saturated and the liquid would be carried over into the carbureter with outgoing air, Therefore, other means must be resorted to to prevent such a happening besides the use of a casing of large cross-sectional area.

With the foregoing in mind, it is an object of the present invention to provide an air cleaner suitable for a down-draft carbureter with the cleaner resting on top of the intake to the carbureter, and which cleaner embodies internal construction whereby the liquid utilized will not be carried over into the carbureter by outgoing air, with no sacrifice of efficiency and even though the cleaner be relatively small in height.

It is also an object of this invention to provide an air cleaner of the character described herein, wherein a direct sweep of the liquid in the direction of the outlet opening ahead of the incoming air is prevented, but amply sufficient liquid for cleansing purposes is permitted to commingle with incoming air by way of eduction.

It is also an object of this invention to provide a liquid bath air cleaner containing a baffle blocking a direct onrushing of the liquid toward the outlet opening, the baffle being constructed in such a manner as to permit an ample quantity of comminglement between air and liquid through the process of eduction.

It is also an object of this invention to provide an air cleaner having a centrally disposed downwardly extending outlet for clean air, and a protected substantially annular inlet, the structure being so formed as to guide incoming air in a manner causing this air to educe a comminglement between itself and cleansing liquid, entrained liquid being removed from the air prior to its exit through said outlet.

Still a further object of this invention is the provision of an air cleaner of the character described herein in which the salient parts are readily removable for the purposes of refilling, cleansing or replacing, the construction being such that when the parts are assembled, they are securely held in position and vibration and rattling are eliminated.

While some of the more salient features, characteristics and advantages of the present invention have been above pointed out, others will become apparent from the following disclosure.

The invention includes these and other features of construction and combinations of parts hereinafter described and shown in a preferred form in the drawings, as more particularly indicated by the claims.

On the drawings:

Figure 1 is a fragmentary, diagrammatic elevation of an internal combustion engine having a down-draft carbureter and equipped with a device embodying principles of the present invention.

Figure 2 is an enlarged vertical sectional view, with parts shown in elevation, of the device shown in Figure 1.

Figure 3 is a reduced plan sectional view through the device taken substantially as indicated by the line III—III of Figure 2.

Figure 4 is a fragmentary vertical sectional view, of the character of Figure 2 but illustrating a slightly different form of baffle construction.

Figure 5 is an enlarged fragmentary plan view of a baffle of a still different form.

Figure 6 is a vertical sectional view of the character of Figures 2 and 4, showing the use of the baffle construction of Figure 5.

Figure 7 is a fragmentary plan view, similar to Figure 5, illustrating an additional form of baffle construction.

As shown on the drawings:

In the illustrated embodiment of the present invention, there is shown an internal combustion automotive engine 10 supplied with a carbureter 11 of the down-draft type, to which is attached, in any desirable manner, an air cleaner, generally indicated by numeral 12, embodying a form of the present invention.

As best seen in Figure 2, the air cleaner 12 comprises a casing of two separable parts, namely, an upper portion or shell 13 and a lower portion or shell 14. The upper shell 13 is provided with any desired number of outwardly disposed, preferably resilient, brackets 15 spot-welded to the shell 13 as at 16 or secured thereto in any other suitable manner. Each of the brackets 15 is bent to provide outwardly extending vertical portions 17 at the upper ends thereof to serve as guide means for the lower shell 14. One or more of the guide parts 17 may be provided with a bolt 18 for engagement by a thumb nut 19, the lower shell 14 being provided with a slot 20 embracing the shank of the bolt 18 so that the parts may be clamped together by means of the thumb nut 19 to hold the casing in operative position. It will be noted that when the two shells are so joined, a space 21 is left therebetween to function as an air inlet. In the upper portion of the lower shell 14, preferably immediately below the thumb nut 19, a series of apertures 22 are provided to afford what is substantially an annular air inlet to the casing.

It will be noted that the annular inlet provided by the apertures 22 is a protected inlet to the extent that dirt and débris from above cannot fall downwardly into the apertures. It will be further noted that a series of apertures precisely as shown are not necessary, but a series of slots or a similar form of opening could equally as well be provided.

When the two casing shells 13 and 14 have been joined together in the manner above described, the upper edge of the lower shell 14 abuts the underside of a flange 23 on a cover 24 spot-welded or otherwise secured to the shell 13. The flange 23 upon the cover extends outwardly sufficient to close the upper end of the space 21 between the shells, whereby the entire upper end of the casing is effectively sealed except for the apertures 22. The central portion of the cover is stepped up as at 25 to provide an interior seat for an annular relatively heavy mesh screen 26 preferably resting loosely in the cover seat. This screen 26 forms a portion of the outlet for cleaned air and holds in position a mass of filtering material 27 which may be crinkled or wavy wire, aluminum shavings, or any other suitable material. The filter mass is retained within the shell 13 by means of a bottom screen 28 preferably loosely disposed between a conduit 29 and the shell 13. This screen 28 is preferably stiff and bowed downwardly. Soldered or otherwise secured to the conduit 29 as at 30 is an annular baffle plate 31 provided with apertures near the periphery thereof at spaced intervals for securement by means of bolt and nut connections 32 to outwardly bent foot portions 33 of the brackets 15, whereby all of the parts within the shell 13 are held securely in position.

However, it will be noted that by the simple expedient of releasing the bolt and nut connections 32, the baffle 31, together with the conduit 29, may be removed, and with equal facility the filter mass 27 may be removed from within the shell 13 for the purposes of cleansing or replacing. In the instance shown in Figures 2 and 3, the baffle 31 is preferably bowed upwardly or dome-shaped in contrast to the lower screen 28 providing an annular open air space 34 in direct communication with the intake area 21 between the shells 13 and 14. Entering air will thus pass over the baffle 31, through the screen 28 and into the filter mass 27.

The outlet conduit 29 is preferably centrally disposed within the shell 13, and is of somewhat less diameter than the upper screen 26, the upper end of the conduit being in the form of a bell 35 extending outwardly to meet the screen 26. The bell 35 on the underside thereof provides an arcuate shoulder which, as will later more fully appear herein, prevents washing liquid from being carried directly over the edge of the conduit 29 and into the carbureter 11. This bell also lessens restriction to air flow and functions as a silencing medium. Obviously, the screen 26 may be shortened and the bell extend therebeyond if so desired.

The lower shell of the casing is provided with an annular bottom 36 soldered as at 37 or otherwise tightly secured to an air outlet conduit 38 extending through the bottom 36 and upwardly within the casing inside of the conduit 29. This conduit 38 is attached in any suitable and wellknown manner to the intake conduit of the carbureter 11 below the bottom 36 of the casing. The lower portion of the shell 14 forms a liquid sump for containing a suitable cleansing liquid 39 such as oil.

An annular outwardly extending bead 40 is provided in the lower part of the shell 14 to define a liquid level for the sump liquid 39 and also to provide an annular space 41 between the shell 14 and the outer edge of the baffle 31. Through this space sump liquid is educed into comminglement with incoming air for cleaning the latter.

In operation, the present invention is extremely simple and highly efficient. Assuming that the device is in operative position upon the top of the down-draft carbureter, as seen in Figure 1, air from the atmosphere will be drawn into the device through the apertures 22 due to the suction created in the internal combustion engine to which the carbureter is attached. The entering air will pass downwardly in the annular space 21 between the shells 13 and 14, and inwardly and upwardly over the upper face of the baffle 31 through the screen 28 and into the filter mass 27. As the air forcibly passes the annular opening 41, which establishes communication between the liquid sump and the air intake, the sump liquid 39 will be educed or drawn through the opening 41 into comminglement with the air.

A thorough comminglement between air and sump liquid will result, and if any impurities are left in the air after such comminglement, these impurities, together with entrained liquid, will be removed from the air in its passage through the filter mass 27 prior to its exit through the screen 26 and downwardly through the outlet conduit 38. The belled end 35 of the conduit 29 causes any of the sump liquid carried to the edge of this conduit to be turned back into the filter mass 27 in a direction substantially opposite to outgoing air to eliminate the likelihood of oil or other sump liquid being carried over into the carbureter and the internal combustion engine.

In Figure 4, I have shown identically the same construction hereinabove described, with the exception of an annular baffle 31a. All of the parts, including the baffle 31a, are secured together and retained in position as hereinabove set forth. In this instance, however, the device is provided with an upward curvature 42 adjacent the outer edge thereof to provide additional guiding means for more positively directing incoming air over the upper surface of the baffle and upwardly into the filter mass 27. Otherwise, the operation of the construction shown in Figure 4 is the same as that of the construction shown in Figures 2 and 3.

In Figures 5 and 6 I have shown another form of baffle construction, a fragmentary plan view of the baffle being shown in Figure 5, and its installation in the cleaner in Figure 6. The structure of Figure 6, with the exception of the particular baffle involved, is the same as that previously described in connection with Figures 2 and 3. In this instance, a baffle 43 is used which is preferably bowed slightly downwardly in the same direction as, but not to the extent as, the lower screen 28. Consequently, the outer edge of the baffle projects above the liquid level in the sump, and in this instance, the baffle is provided with a plurality of slots 44 therein, preferably with the edges of the slots bent oppositely to one another as seen more clearly in Figure 6 to provide suitable openings through which sump liquid may be educed into comminglement with incoming air. If so desired, small apertures 45 (Figure 5) may also be provided for a further eduction of sump liquid. The slots 44, while being shown as radially extending slots, of course can be cut at any desired angle. The operation of a cleaner including the baffle 43 is the same as that above described.

In Figure 7, I have shown still another form of baffle 46 provided with slits 47 therein, the edges on each side of the slits being bent in any desired manner, either up or down, one or both, to provide an opening through which sump liquid may be educed by incoming air. These slits may be V-shaped as seen in Figure 7, or any other suitable shape, and may be disposed at any desired angle in the baffle. The operation of a cleaner utilizing baffle 46, which may be bowed upwardly, bowed downwardly, or flat, is the same as described for the previous construction.

It will, of course, be appreciated that any of the baffles may be substituted one for the other as may be desired and that the various constructions of the various baffles may be combined in any desired manner, such for example, as slotting or putting apertures in the baffle 31, or the baffle 31a, without departing from the spirit of this invention.

While the illustrated embodiment of this invention has been shown herein as circular in shape, and the invention has herein been so described, it is obvious that the shape of the casing and interior component parts may be altered as best deemed meet without departing from the principles and spirit of the invention.

From the foregoing, it will be apparent that I have provided an air cleaner highly desirable for use in connection with mechanism having a down-draft air intake, the air cleaner being internally constructed to prevent the carrying over of cleansing liquid into the cleaned air outlet, and at the same time provide a thorough comminglement of incoming air with cleansing liquid, even though the cleaner is sized for installation in a very limited space. It will also be apparent that the cleaner may readily be dismantled for cleansing or replacing of parts and that various forms of baffles may be utilized within the cleaner, substituted one for the other if so desired. In addition, the cleaner is obviously simple in construction, highly efficient in operation, durable, and extremely economical to manufacture and operate.

I am aware that many changes may be made and numerous details of construction may be varied through a wide range without departing from the principles of this invention and I therefore do not purpose limiting the patent granted hereon otherwise than necessitated by the scope of the appended claims.

I claim as my invention:

1. In an air cleaner, a casing having a substantially annular inlet, tubular means extending through the lower portion of said casing into the upper portion thereof forming an outlet for cleaned air, said casing having a closed top, said casing also having a liquid sump therein around said tubular means, and a baffle in said casing around said tubular means disposed in the path of incoming air so that said air will pass over the upper face of said baffle, there being an opening establishing communication between said sump and the space above said baffle through which liquid is drawn by incoming air, and means between said baffle and the entrance to said tubular means for removing entrained liquid from outgoing air.

2. In an air cleaner, a casing comprising separable portions in telescopic relationship with a space therebetween providing an air inlet, releasable means for holding said portions together, a tube secured to the lower of said portions and projecting into said casing providing an air outlet, said lower portion being formed to provide a liquid sump around said tube, another tube in the upper portion of said casing telescopically associated with the first said tube, filter means around the upper tube, and a baffle between said sump and filter means.

3. In an air cleaner, a casing comprising separable portions spaced apart to provide an air inlet therebetween, an outlet conduit in each of said portions, said conduits being telescopically associated, and air cleansing means in said casing between said inlet and said outlet conduits.

4. In an air cleaner, a casing including separable portions telescopically associated in spaced relationship to provide an inlet passage therebetween, the outer of said portions having a series of openings therein providing substantially an annular inlet to said passage, an outlet conduit projecting into said casing, one of said portions having a liquid sump therein around said conduit in communication with said passage, and filter means in said casing around said conduit to remove entrained liquid from outgoing air.

5. In an air cleaner, a casing having an air inlet and a liquid sump, baffle means of approximately the area of said casing disposed adjacent said sump and arranged to provide communication between said sump and the region on the opposite side of said baffle means, to permit a comminglement of air and sump liquid, and outlet conduit means extending through a wall of said casing from a point on said opposite side of said baffle means, the interior end of said conduit means being shaped to turn back sump liquid carried that far by outgoing air.

6. In an air cleaner, a casing having an inlet and an outlet separated from said inlet, said casing also having a liquid sump therein, and a baffle adjacent said sump, said baffle having the outer margin thereof curved in a direction to guide incoming air through said casing, there being an opening establishing communication between said sump and the region above said baffle through which sump liquid may be educed by air passing over said baffle.

7. In an air cleaner, a casing having an inlet and an outlet separated from said inlet, said casing having a liquid sump, and a baffle adjacent said sump and in the path of air entering said inlet, said baffle having openings therein through which sump liquid may be educed by entering air passing over said baffle.

8. As an article of manufacture, an air cleaner for disposition on top of the air intake conduit of a down-draft carbureter, including a casing having an air inlet, outlet conduit means centrally disposed in said casing and extending therebelow, said casing having a liquid sump around said conduit means, said conduit means having an outwardly flared upper end, and filter means above said sump disposed around said conduit means beneath the flare of the upper end thereof and extending above the upper end of said conduit means.

9. As an article of manufacture, an air cleaner for disposition on top of the air intake conduit of a down-draft carbureter, including a casing having an air inlet, said casing also having a liquid sump at the bottom thereof, outlet conduit means in said casing and extending through the bottom thereof, the arrangement being such that entering air will commingle with sump liquid, said conduit means projecting inside the casing above the sump and having a flared upper end, and filter means around said conduit means and intimately fitting beneath the flare thereof in the path of outgoing air.

10. In an air cleaner, a pair of separable casing sections spaced apart to provide an inlet passage therebetween, one of said sections having an air outlet, a baffle in one of said sections, and means removably connecting said baffle to the other of said sections to hold the sections together.

11. In an air cleaner, a pair of separable casing sections spaced apart to provide an inlet passage therebetween, one of said sections having an air outlet, a baffle in one of said sections, means removably connecting said baffle to the other of said sections to hold the sections together, and filter means supported by said baffle in advance of said outlet.

12. In an air cleaner, a pair of casing sections spaced apart to provide an air inlet passage therebetween, an outlet conduit in each of said sections, said conduits being telescopically associated, filter means in said casing between said inlet and said conduits, one of said sections having a liquid sump therein, a baffle in one of said sections between said sump and said filter means, and means removably connecting said baffle to the other of said sections.

13. In an air cleaner for disposition on top of an air intake conduit, a pair of separable casing sections having an inlet passage therebetween, the lower of said sections having a liquid sump therein, conduit means in each of said sections arranged for telescopic association to define a path for outgoing cleaned air extending from a point well above said sump through the bottom of the lower sections, the innermost part of said conduit means being shaped to turn back sump liquid carried that far by traveling air, filter means disposed around said conduit means above said sump, and a baffle disposed below said filter means and having openings therein through which sump liquid may be educed by incoming air.

14. In an air cleaner, a casing having an air inlet and comprising separable sections, outlet conduit means in each of said sections for telescopic association to define a complete outlet passage for cleaned air, the lower section having a liquid sump therein through which the respective outlet section extends, and filter means carried by the upper casing section around the respective outlet section.

15. In an air cleaner, a casing having an air inlet and comprising separable sections, outlet conduit means in each of said sections for telescopic association to define a complete outlet passage for cleaned air, the lower section having a liquid sump therein through which the respective outlet section extends, filter means carried by the upper casing section around the respective outlet section, and a baffle supported by one of said casing sections below said filter means and positioned so that air must pass thereover in traveling through the cleaner, said baffle being arranged to provide an opening through which sump liquid may be educed by traveling air.

MILTON W. ZANDER.